United States Patent [19]

Cook

[11] 3,710,937

[45] Jan. 16, 1973

[54] METHOD AND APPARATUS FOR TRANSPORTING GLASSWARE

[75] Inventor: Charles W. Cook, Muncie, Ind.

[73] Assignee: Ball Corporation, Muncie, Ind.

[22] Filed: Dec. 18, 1970

[21] Appl. No.: 99,436

[52] U.S. Cl.....................209/74 R, 198/24, 198/25, 198/104
[51] Int. Cl...............................................B07c 3/02
[58] Field of Search.....209/74, 75; 198/22, 22 B, 24, 198/104, 25

[56] References Cited

UNITED STATES PATENTS

| | | | |
|---|---|---|---|
| 1,756,561 | 4/1930 | Larsen | 198/22 B |
| 1,828,324 | 10/1931 | Kruse | 198/22 R |
| 2,155,088 | 4/1939 | Hopkins | 198/22 R |

Primary Examiner—Richard A. Schacher
Attorney—Harris & O'Rourke

[57] ABSTRACT

Apparatus for rapidly handling glassware comprising a rotatable transport wheel having glassware supporting means thereon for presentation of glassware to inspection stations, feed means for sequentially introducing glassware to such supporting means, a pushout arm for positively and rapidly removing glassware from such wheel with a large change in direction of travel onto a co-ordinated take-out screw and means for selectively separating specific glassware items from the inspected glassware without interrupting the overall transport of glassware. Also, a method for handling glassware involving introducing, transporting and removing glassware from a transport wheel in a timed relationship as well as removing selected glassware from the stream of glassware being processed.

9 Claims, 3 Drawing Figures

INVENTOR.
CHARLES W COOK

INVENTOR.
CHARLES W. COOK
BY Harris and O'Rourke
ATTORNEYS

METHOD AND APPARATUS FOR TRANSPORTING GLASSWARE

BACKGROUND OF THE INVENTION

This invention relates to a method and apparatus for rapidly transporting glassware for presentation to a series of testing stations and thereafter rapidly and positively removing the glassware from the testing environment with a large change of direction of travel and dividing the glassware into accepted and rejected categories in response to the output of the individual testing stations without interrupting the rapid throughput of glassware through the apparatus.

It is well known in the glassware manufacturing art to subject newly manufactured glassware to a number of quality checks and tests. Such well-known tests are directed towards, for instance, the discovery of improperly sized glassware, glassware with splits, checks, inclusions, seeds or other defects. Since a number of independent tests are usually required to maintain the high quality of accepted glassware, it is conventional to provide an apparatus wherein a number of stations are employed and the glassware is sequentially advanced from station to station with one or more tests being conducted at each station. Apparatus of this nature is described in U.S. Pat. No. 3,245,529, issued Apr. 12, 1966, to Wilbur O. Doud.

When a test indicates that an individual item is defective the output from the test is usually stored in an electronic memory and, by means of delays and other conventional provisions, the result is preserved and presented at the exit portion of the multistation testing apparatus as the subject item passes from the apparatus. At this point, the subject item is segregated from the accepted glassware and either recycled or otherwise disposed of. If desired, the electronics and reject mechanism may be modified so that glassware items rejected as the result of different tests are rejected in distinct differing positions.

While all of the above ends have been accomplished in widely varying means known to the art, there still exists some problem in properly handling relatively fragile glassware which must be passed through the testing apparatus at very high line speeds. Of course, glassware is manufactured in a highly sophisticated manner utilizing high output automated machinery. Testing is desirably not a sampling technique but a one hundred percent examination of all glassware, at least with regard to defects which may compromise the structural integrity of the glassware. Glassware destined for use as food containers, of course, must undergo extensive individual testing. Thus, the problem arises of maintaining very high line speeds in which the glassware moves rapidly and the need for the glassware to be entirely processed through an apparatus in which the glassware is rapidly and accurately positioned for a series of tests. With the established concept of utilizing a transport wheel to present the glassware to the testing stations, and with the increasing number of testing stations involved, the glassware must be removed quickly and in a direction substantially different than that in which it is traveling when it arrives at the exit position. Glassware handling at high speeds with rapid changes of direction and speed with accompanying high forces presents a difficult problem in view of the possibility of breaking the glassware when exposing it to such high forces.

Accordingly, it is the object of the present invention to provide glassware handling wherein the glassware may be moved through an apparatus at high speeds.

Another object of the invention is to provide glassware handling which permits glassware to be processed through the apparatus, including changes in direction, at speeds compatible with production speeds of glassware.

A further object of the invention is to provide apparatus wherein the glassware is transferred in timed relationship, particularly at the critical point wherein the direction of travel of the glassware is substantially altered.

A still further object of the invention is to provide for the rapid removal of selected items without interrupting the fast moving stream of glassware.

These and other objects and advantages of the present invention will become apparent to those skilled in the art from a consideration of the following specification and claims.

SUMMARY OF THE INVENTION

According to the instant invention, glassware is intercepted after leaving the annealing lehr and while it is proceeding on a conveyor belt in a single file fashion. The glassware is then fed into a feed screw wherein it is secured between the screw, screw lands and a spaced barrier and advanced by the action of the lands of the screw as the screw rotates. A timed relationship is maintained between the feed screw and a transport wheel having bottle support means disposed thereon. Thus, the glassware is presented by the feed screw to the transport wheel as the support means on the transport wheel comes into a receiving relationship with the feed screw. Thereafter, the glassware is moved from test station to test station as the transport wheel is intermittently rotated. The type of test stations, number of test stations, specific support means and other aspects of the transport wheel operation are well-known and not particularly critical to the instant invention. The need for numerous tests, and the tests themselves are, of course, well-known in the art.

A particularly critical aspect of the glassware handling is encountered when the glassware is removed from the wheel and returned to the bottle line or rejected. At this portion, the glassware is removed in a direction often substantially perpendicular, or even opposite, to the direction the glassware is moving when it arrives at the exit position. Further, this movement must be extremely fast in order to vacate the transport wheel and not to interfere with subsequent movement of the transport wheel. Also, the movement must be coordinated with a take-out means such as a take-out screw in order to maintain the indexed position of the glassware being removed. This is necessary since the test information concerning a particular item being removed from the wheel is stored in the electronic circuitry and the bottle will be accepted or rejected in response to its position when such information is sent out from the electronic circuitry. Since the take-out screw is constantly moving, it is desirable to introduce the glassware into the take-out screw in a smooth, continuous fashion to avoid stopping the glassware movement thereby minimizing the forces acting upon the glassware. This, of course, requires precise and positive cooperation between the transport wheel, the removal means and the take-out screw. Accordingly, a particularly important aspect of the instant invention is a pushout arm having a carefully timed movement which permits the bottle to be positively moved away from the transport wheel at a rapid velocity and which permits the item to be rapidly and accurately placed on the outlet screw when the land of the screw is in the proper position to receive the glassware without stopping or appreciably altering the glassware movement. The pushout arm is activated by a cam arrangement which is positively linked to the screw and accordingly, the timing between the pushout arm and the screw constantly maintained. Further, the pushout arm and outlet screw are interconnected with the transport wheel and the inlet screw so the entire assembly is maintained in a co-ordinated relationship regardless of the specific speed of operation of the entire apparatus.

Another important feature of the invention is the reject gate which must react with the greatest speed to selectively segregate a single bottle from a rapidly moving stream of bottles traveling on the outlet screw. It has been found that a linearly movable gate in conjunction with a belt moving in a direction substantially perpendicular to the glassware movement on the outlet screw provides a simple, fast reacting and foolproof mechanism for segregating accepted and rejected glassware. A simple, fast reciprocating movement of the gate enables a single bottle to be carried away from the outlet screw in a direction normal to the outlet screw in a very short period of time thus allowing the gate to quickly close and prevent jamming or escape of following glassware. The linearly moving gate takes full advantage of the separation of adjacent glassware items by the lands of the take-out screw. Since the removal of the reject glassware is in a direction essentially perpendicular to the direction of travel for the acceptable glassware, the time period required to move it from the stream of glassware is the absolute minimum for a given attainable acceleration of the individual rejected piece of glassware. Therefore, the space in the flow of glassware is vacated almost immediately and the glassware flow is not disrupted.

BRIEF DESCRIPTION OF THE DRAWINGS

Other benefits and advantages of the method and apparatus of the present invention will be apparent from the following detailed description and drawings in which.

DESCRIPTION OF THE PREFERRED EMBODIMENT

Figure 1:
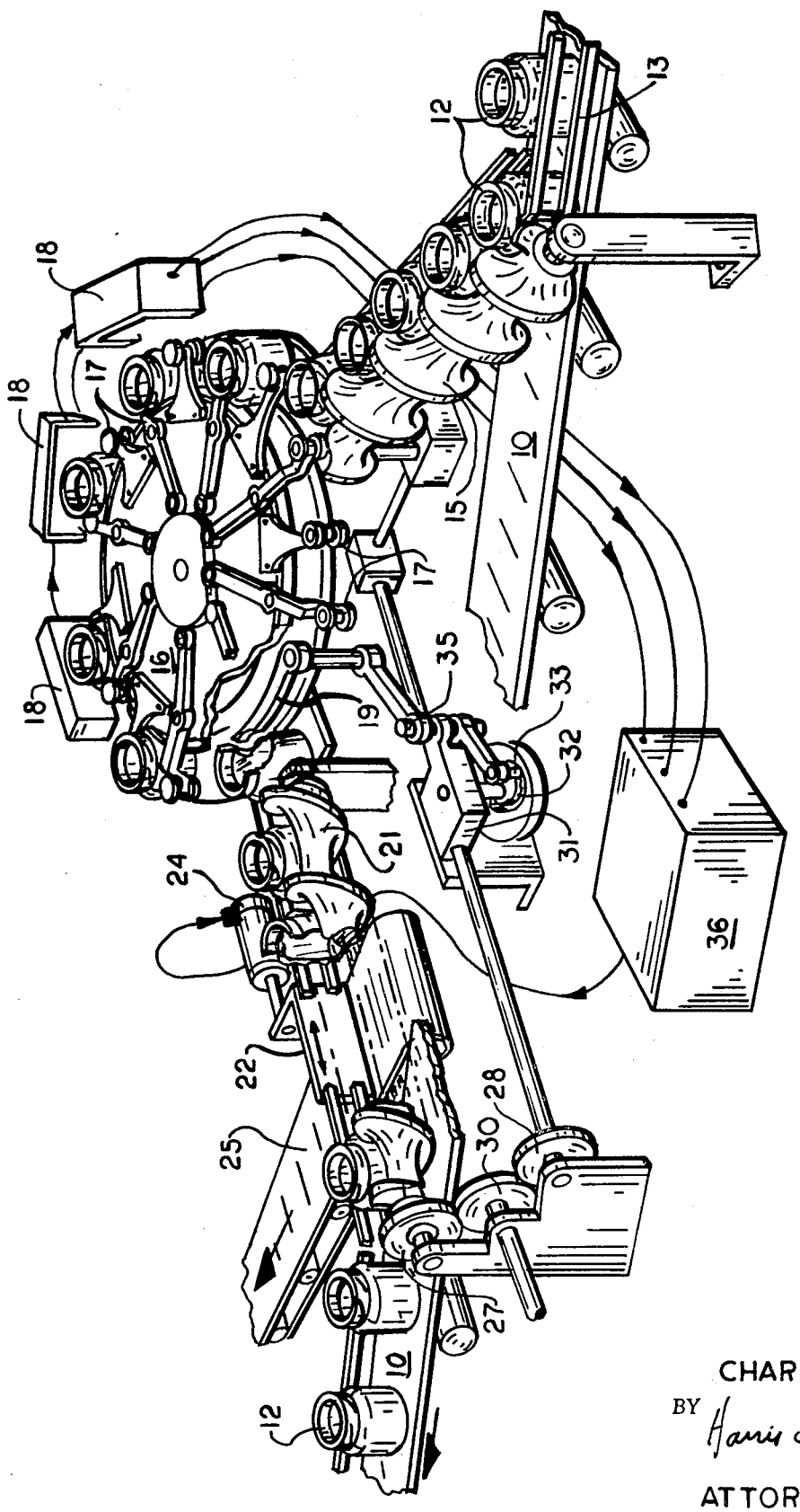
FIG. 1 is a perspective view of the apparatus of the invention.

As shown in FIG. 1, conventional bottle line 10 carries a steady stream of bottles 12. Guide 13 is positioned on bottle line 10 to divert bottles 12 into feed screw 15. Bottles 12 are then carried along feed screw 15 to transport wheel 16 which then moves in timed relationship to feed screw 15 so that bottle support 17 is in a position to accept bottles 12 at such time as feed screw 15 presents bottles 12 to bottle support 17. Transport wheel 16 then sequentially presents the bottles to inspection stations 18 whereat the bottles are inspected in a conventional manner. After presentation to inspection stations 18, transport wheel 16 carries the bottles 12 to the exit portion of the apparatus whereat a pushout arm 19 rapidly transfers the bottles 12 onto take-out screw 21. Take-out screw 21 carries the bottles 12 away from transport wheel 16 and past reciprocal reject gate 22 which may be activated by solenoid 24. Disposed perpendicularly to take-out screw 21 is reject belt 25. As bottles 12 pass reject gate 22, the bottom surface of the bottle rests on reject belt 25. Thus, when reject gate 22 is opened by solenoid 24, reject belt 25 carries the rejected bottle 12 away from outlet screw 21. However, when reject gate 22 is closed, bottles 12 continue along outlet screw 21 and the bottom surface easily slides over reject belt 25.

Figure 2:
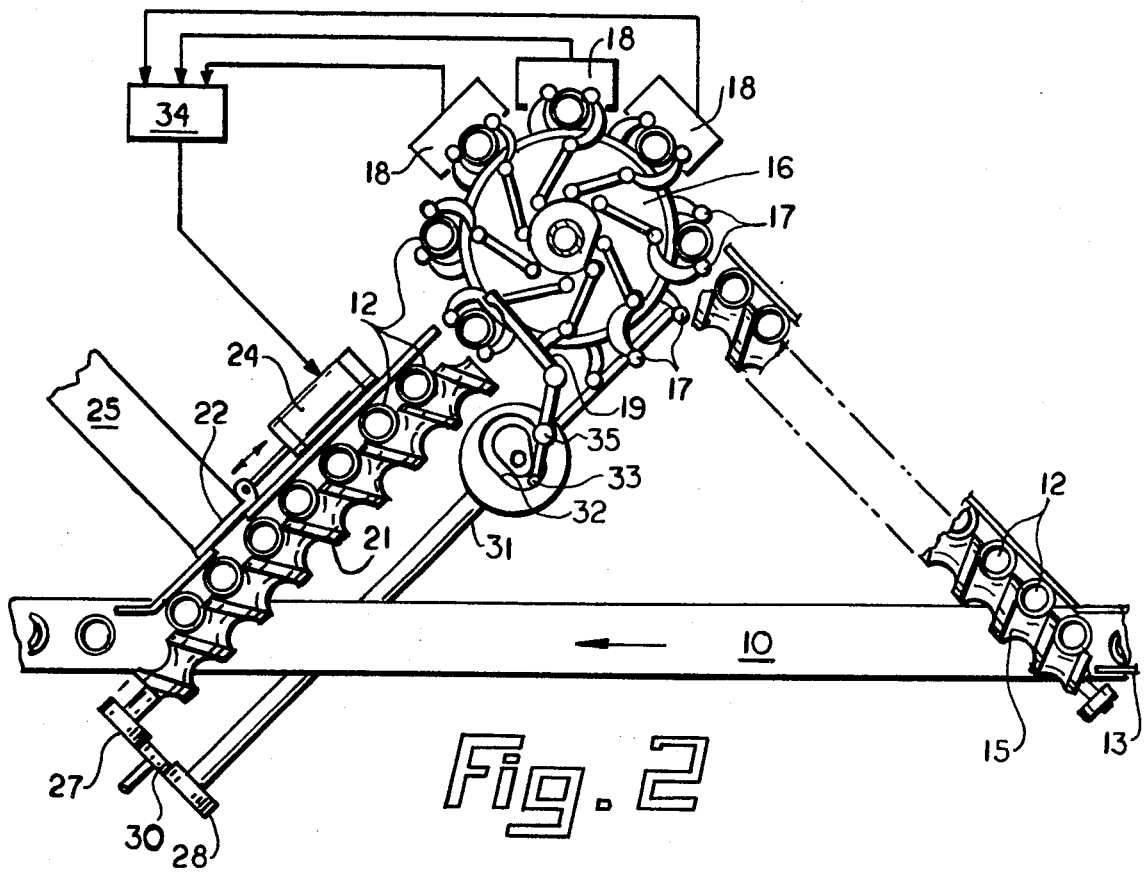
FIG. 2 is a plan view of the apparatus shown in FIG. 1.

The details of the ejection process can be more readily appreciated with reference to FIG. 2 wherein it can be seen that outlet screw 21 and pushout arm 19 are co-ordinated by means of screw gear 27 on the end of outlet screw 21, cam gear 28 which is mechanically connected to screw gear 27 by means of idler gear 30. Cam gear 28 rotates cam drive 31 and accordingly rotates cam surface 32. Cam follower 33, which rides on cam surface 32, moves pushout arm 19 which is mounted on pivot 35 in the above described manner.

Figure 3:
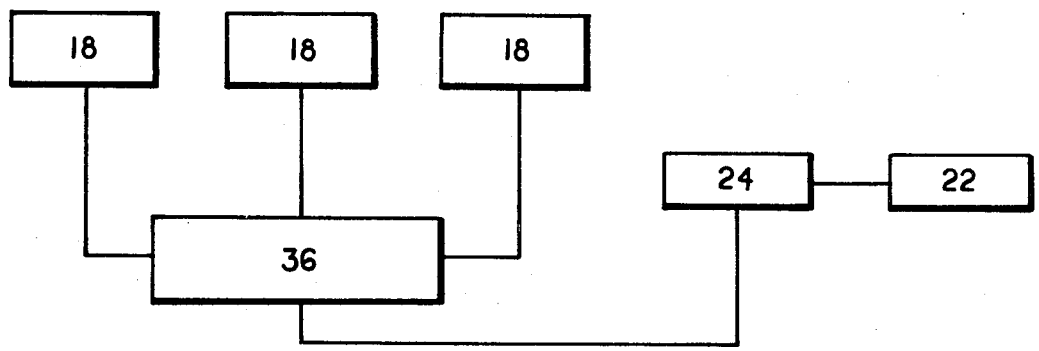
FIG. 3 is a schmatic illustration of the apparatus of the instant invention including the electronic components.

As shown in FIG. 3, inspection stations 18 are connected to the inspection data processing unit 36. Inspection data processing 36 stores and co-ordinates the signal from the inspection stations 18 and ultimately opens or closes reject gate 22 depending upon the signals. The details of such a system can be found in U.S. Pat. No. 3,386,575, for Inspection System for Multi-Station Inspection Apparatus, issued June 4, 1968, to R. M. Quinn. Accordingly, inspection data processing unit 36 notes the information pertaining to a given subject of inspection from each of inspection stations 18 at the time the item is at each station. The signals are processed through data storage and delay means, as described in the above-mentioned patent, and an appropriate signal for acceptance or rejection is sent to solenoid 24 when the given item is adjacent reject gate 22.

It will be apparent from the above description and drawings that various modifications in the specific method and apparatus described and shown in detail in the drawings may be made within the scope of the invention. Therefore, the invention is not intended to be limited to the specific method and apparatus described and shown in detail except as required by the following claims.

What is claimed is:

1. Apparatus for removing glassware from support means carried on a transport wheel, comprising: a pushout arm movably mounted to engage and move glassware in a predetermined direction away from the transport wheel, cam means for reciprocally actuating the pushout arm so that said portion engagable with glassware is repeatedly moved in said predetermined direction away from said transport wheel, a take-out screw conveyor means supported adjacent the pushout arm; and drive means operatively connected with said cam means and said take-out screw means so that said pushout arm and screw means function in a timed relationship whereby glassware is rapidly moved away from the transport wheel by the pushout arm and accurately placed in the take-out screw conveyor means by the same action of the pushout arm.

2. Apparatus as set forth in claim 1, wherein the pushout arm is mounted adjacent the cam means, and wherein the cam means is a rotatably secured cam with a portion of the pushout arm bearing upon a cam surface whereby rotation of the cam produces a reciprocating movement in that portion of the pushout arm engagable with said glassware.

3. Apparatus as set forth in claim 2, wherein the cam is rotatably driven by a drive means having a gear attached thereto, which gear is in turn operatively connected with a second gear attached to the take-out screw conveyor means, whereby the cam and the take-out screw conveyor means are operatively connected to function in a timed relationship.

4. Apparatus for removing glassware from support means carried on a transport wheel, comprising: a pushout arm movably mounted to engage and move glassware in a direction away from the transport wheel, means for reciprocally actuating the pushout arm, a take-out screw conveyor means supported adjacent the pushout arm, the pushout arm actuating means and the take-out screw means being operatively connected to function in a timed relationship, whereby glassware is rapidly moved away from the transport wheel by the pushout arm and accurately placed in the take-out screw conveyor means by the same action of the pushout arm, and said take-out screw conveyor means incorporating a linearly movable reject gate along its length whereby specific items of glassware conveyed on said take-out screw conveyor means may be selectively removed through said gate.

5. Apparatus as set forth in claim 4, wherein a movable belt is disposed immediately below and adjacent the take-out screw conveyor means at the location of the reject gate, the movable belt being disposed substantially perpendicular to the direction of travel of the screw conveyor means, whereby articles may be quickly and selectively removed from the take-out screw conveyor means by opening said reject gate and carrying the articles away from reject take-out screw conveyor means on said movable belt.

6. Apparatus for removing bottles from a rotatable transport wheel wherein the bottles are removably secured to the transport wheel by support means, comprising: a pivotally mounted pushout arm bearing upon a rotatably mounted cam, the pushout arm being movable in response to rotation of the cam to move towards and away from the transport wheel, a rotatably mounted take-out screw conveyor positioned adjacent the transport wheel at substantially the end point of travel of the pushout arm away from the transport wheel and having a direction of travel away from the transport wheel and substantially in line with the final direction of the travel of the pushout arm at the outermost movement away from the transport wheel, the screw conveyor having a mechanical connection to a drive means which drive means is also connected to rotate the cam, whereby the transport wheel, cam and pushout arm operate in a timed relationship to move the pushout arm away from the transport wheel to carry a bottle away from the transport wheel and into the screw conveyor in a continuous timed sequence; and a linearly movable reject gate and a movable belt positioned along the length of the screw conveyor with said belt disposed below and adjacent the reject gate and in the path of travel of the bottoms of bottles being transported along the screw conveyor whereby, upon opening of the reject gate, bottles can be quickly removed from the screw conveyor and carried away therefrom on the movable belt.

7. A method for rapidly transporting bottles, comprising: supporting bottles at spaced positions on a transport wheel, rotating the transport wheel to a number of inspection stations, bringing a pushout arm to bear upon a bottle at a selected position to move the bottle away from the transport wheel and into a screw conveyor means in a fast, continuous motion, accepting the bottle into the screw conveyor means substantially in the direction of travel of the bottle as a result of the movement from the transport wheel and maintaining at least a portion of the transfer velocity of the bottle as it is accepted into the screw conveyor, whereby bottles are rapidly removed from the vicinity in which it may interfere with movement of the transport wheel and introduced into the screw conveyor with the minimum possible forces bearing upon the bottle commensurate with the rapid speed of the operation, passing bottles being moved in the screw conveyor over a conveyor belt moving perpendicular to the direction of travel of the screw conveyor with the bottom portions of the bottles being in contact with the conveyor belt, and removing selected bottles from the screw conveyor by opening a movable gate in the screw conveyor at the location of the movable belt.

8. Apparatus for transporting and diverting articles, comprising: a pushout arm having a portion engagable with articles to be transported from a predetermined position; connecting means operatively connected with said pushout arm; article conveying means; actuating means operatively connected with said connecting means and said conveying means for causing movement of said portion of said pushout arm to thereby move articles engaged therewith away from said predetermined position toward said conveying means and for causing said conveying means to move articles received from said pushout arm along a predetermined path, said conveying means and said pushout arm being actuated by said actuating means in a predetermined timed relationship; and article diverting means for diverting selected articles from said conveying means during movement of said articles by said conveying means along said predetermined path.

9. The apparatus of claim 8 wherein said pushout arm engages articles at the discharge position of a transport wheel, wherein said connecting means includes cam means, wherein said article conveying means includes a screw drive means, wherein said actuating means drives said transport wheel, cam means, and screw drive means in a predetermined timed relationship, and wherein said diverting means acts upon said selected articles to be diverted during movement of said articles by said screw drive means.

* * * * *